US009416634B2

(12) United States Patent
Olenick et al.

(10) Patent No.: US 9,416,634 B2
(45) Date of Patent: Aug. 16, 2016

(54) MULTIPLE SECTIONED WIRE-WRAPPED SCREENS

(71) Applicant: Weatherford/Lamb, Inc., Houston, TX (US)

(72) Inventors: Peter Olenick, Spring, TX (US); Henry Nguyen, Houston, TX (US); Robert Hodge, Cypress, TX (US); Ronnie Royer, Spring, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 260 days.

(21) Appl. No.: 14/072,282

(22) Filed: Nov. 5, 2013

(65) Prior Publication Data
US 2014/0060816 A1 Mar. 6, 2014

Related U.S. Application Data

(62) Division of application No. 13/170,608, filed on Jun. 28, 2011, now Pat. No. 8,602,096.

(51) Int. Cl.
*E21B 43/08* (2006.01)
*B01D 29/11* (2006.01)
*B01D 29/48* (2006.01)

(52) U.S. Cl.
CPC ............ *E21B 43/084* (2013.01); *B01D 29/111* (2013.01); *B01D 29/48* (2013.01); *E21B 43/086* (2013.01); *E21B 43/088* (2013.01); *Y10T 29/49604* (2015.01)

(58) Field of Classification Search
CPC ... E21B 43/084; E21B 43/086; E21B 43/088; B01D 29/111; B01D 29/48; Y10T 29/49604
See application file for complete search history.

(56) References Cited

U.S. PATENT DOCUMENTS

| 4,352,512 A | 10/1982 | Janssen et al. |
| 5,318,119 A | 6/1994 | Lowry et al. |

(Continued)

FOREIGN PATENT DOCUMENTS

| CA | 2807486 | 8/2010 |
| GB | 2314281 A | 12/1997 |

(Continued)

OTHER PUBLICATIONS

Partial Search Report in corresponding EP Appl. EP 12174162, dated Mar. 5, 2015.

(Continued)

*Primary Examiner* — Yong-Suk (Philip) Ro
(74) *Attorney, Agent, or Firm* — Blank Rome LLP (57) ABSTRACT

Operators manufacture a wellscreen by forming a wire-wrapped screen on a base pipe. Rather than stopping and restarting winding, the desired length of screen is completed along the base pipe, and then the wire screen is segmented into a plurality of screen sections as required for the various zones and details of the implementation. Operators arrange the screen sections relative to one another on the base pipe, which can have different lengths with and without perforations. On the free ends of these separate screen sections, mating split ring components fit around the free ends and the base pipes. Male edges of one split ring component mate to complementary female edges of another to form the end ring around the screen section and base pipe, and longitudinal welds made in seams along the mating edges affix the split ring components together.

25 Claims, 8 Drawing Sheets

(56) References Cited

U.S. PATENT DOCUMENTS

| | | | |
|---|---|---|---|
| 5,355,948 | A | 10/1994 | Sparlin et al. |
| 6,412,564 | B1 | 7/2002 | Senior, Jr. et al. |
| 6,715,544 | B2 | 4/2004 | Gillespie et al. |
| 6,991,030 | B2 | 1/2006 | Setterberg, Jr. |
| 7,281,319 | B1 | 10/2007 | Allford |
| 7,464,752 | B2 | 12/2008 | Dale et al. |
| 7,475,725 | B2 | 1/2009 | Yeh et al. |
| 7,503,386 | B2 | 3/2009 | Rouse et al. |
| 7,690,097 | B1 | 4/2010 | Cooper et al. |
| 2008/0035330 | A1 | 2/2008 | Richards |
| 2009/0008085 | A1 | 1/2009 | Roaldsnes |
| 2009/0120641 | A1 | 5/2009 | Yeh et al. |
| 2009/0229823 | A1 * | 9/2009 | Moen .................. E21B 43/088 166/302 |
| 2012/0037357 | A1 | 2/2012 | Lopez et al. |

FOREIGN PATENT DOCUMENTS

| | | |
|---|---|---|
| WO | 2005/061850 A1 | 7/2005 |
| WO | 2012/021397 A1 | 2/2012 |
| WO | WO2012021397 A1 | 2/2012 |

OTHER PUBLICATIONS

Patent Examination Report No. 1 received in corresponding Australian application No. 2012203356, dated Nov. 8, 2013.

Canadian Examination Requisition received in corresponding Canadian application No. 2,778,498, dated Jan. 16, 2014.

Baker Hughes, "Completions and Production: BakerWrapXP, the new standard for reliable sad-control," Baker Hughes Brochure, (c) 2010, 8 pages.

Weatherford, "Houston Well Screen, Pioneers in Sand Control Technology," Weatherford Completion Systems, Brochure 130.01, (c) 2000.

Halliburton, "Sand Control Screens, PetroGuard Wrap Screen," Halliburton Completion Tools brochure H064798/10, (c) 2010, 2pgs.

Valley Perforating Co., "Valley Perforating Co. Liner Handbook, Licensed Under API Spec 5CT," undated, obtained from http://www.valleyperf.com/sandbook/schb.pdf, 45 pages, 2011.

Weatherford, "Conventional Well Screens," Weatherford Brochure 607.05, (c) 2004-2010.

Weatherford, "FloReg Inflow Control Device (ICD)," Weatherford brochure 6233.01, (c) 2009-2010.

Weatherford, "Sand Screen Selector, Open Hole," Weatherford Brochure 6911.00, (c) 2010.

Yeh, et al., "A Self-Mitigating Sand Control Screen," Society of Petroleum Engineers, presented at 2009 SPE European Formation Damage Conference in Scheveningen, The Netherlands, May 27-29, 2009, copyright 2009, 6 pages.

Extended European Search Report and Written Opinion in corresponding EP Appl. EP 12174162, dated Jul. 31, 2015.

Patent Examination Report No. 1 in counterpart Australian Appl. 2014259558, dated Oct. 8, 2015.

* cited by examiner

MULTIPLE SECTIONED WIRE-WRAPPED SCREENS

CROSS-REFERENCE TO RELATED APPLICATIONS

This is a divisional of U.S. application Ser. No. 13/170,608, filed 28 Jun. 2011, which is incorporated herein by reference in its entirety.

BACKGROUND

Subterranean filters, also known as "sand screens" or "wellscreens," have been used in the petroleum industry for years to remove particulates from production fluids. The wellscreens have a perforated inner pipe and at least one porous filter layer wrapped around and secured to the pipe. Typically, the wellscreens is deployed on a production string, produced fluid passes through the filter layer and into the perforated pipe to be produced to the surface.

One type of wellscreen is a wire-wrapped screen. The two typical types of wire-wrapped screens include slip-on screens and direct-wrap screens. A slip-on screen is manufactured by wrapping a screen jacket on a precisely machined mandrel. Then, the jacket is later slipped on a base pipe and the end of the jacket is attached to the base pipe, typically by welding. An example of how one type of slip-on screen is manufactured by heating and shrink fitting is disclosed in U.S. Pat. No. 7,690,097.

The slip-on screen may allow for precise slots to be constructed, but the screen is inherently weaker than a direct-wrap screen. Discrepancies in the slip-on screen, such as variations in the spacing between the screen jacket and the base pipe, can be problematic. For example, differential pressure usually exists across the slip-on screen when in service, and sufficient differential pressure can cause the wires and the rods to bend inwardly into contact with the base pipe. Such a collapse will result in a shifting of the coils of wire forming the screen and reduce or destroy its ability to serve its intended purpose.

Figure 1A:
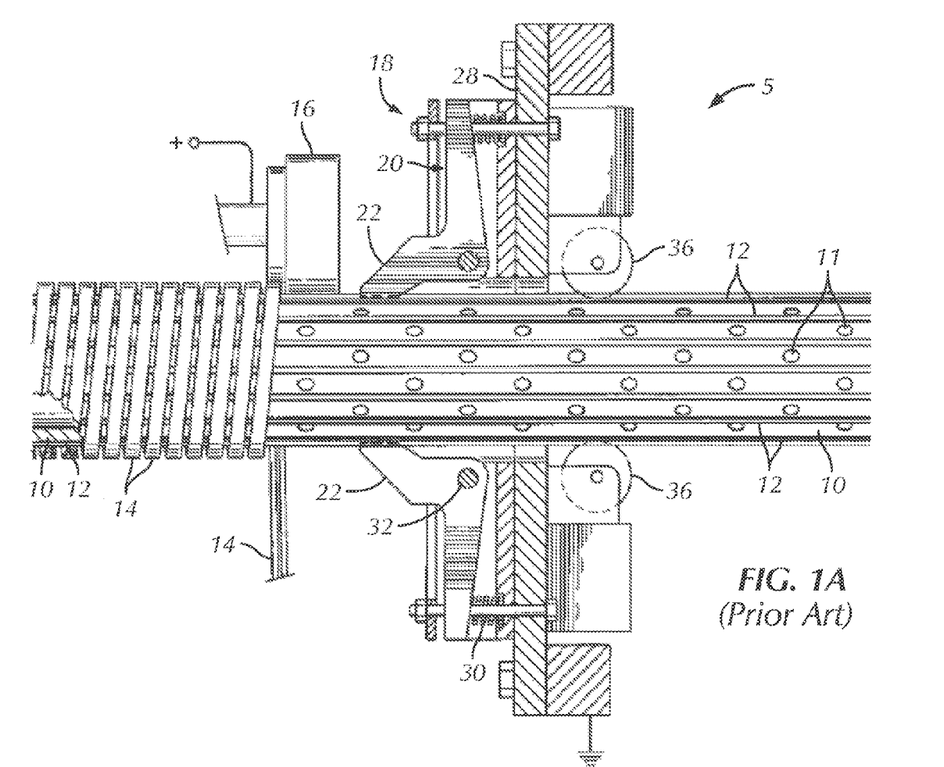
FIG. 1A shows a partially exposed side view of an apparatus for wrapping a base pipe and rods with wire.
Figure 1B:
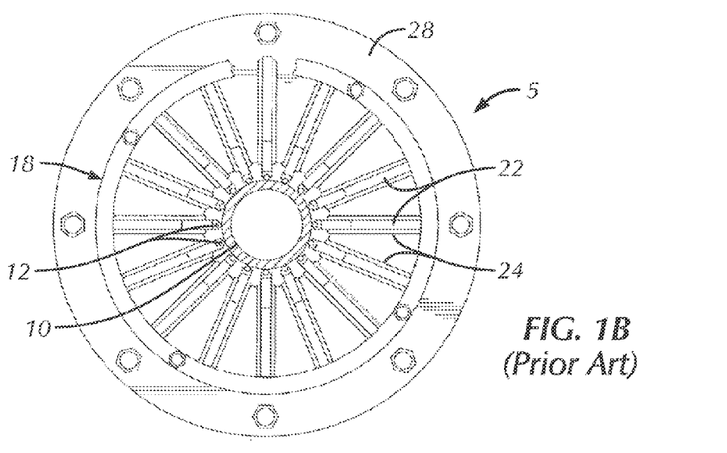
FIG. 1B shows an end section of the apparatus of FIG. 1A.

The direct-wrap screen is constructed by wrapping the screen directly on the perforated base pipe. As expected, this results in a stronger screen because any annulus between the screen jacket and the base pipe is eliminated. FIGS. 1A-1B show an apparatus 5 for constructing a wire-wrapped screen in place directly on a base pipe 10. Spaced around the outside of the base pipe 10, a number of rods 12 extend along the pipe's outside surface. The apparatus 5 wraps the wire 14 around the pipe 10 and the rods 12 to form a screen jacket. A drum (not shown) and other wire feeding components known in the art feed the wire 14 as it is being wrapped, and these components usually hold the wire in tension to bend around the pipe 10 and the rods 12.

To wrap the wire 14, the pipe 10 and rods 12 are typically rotated relative to the apparatus 5. At the same time, the pipe 10 and rods 12 are moved longitudinally at a speed that provides a desired spacing between the adjacent coils of wire 14. This spacing is commonly referred to as the "slot." Alternatively, the apparatus 5 can be moved longitudinally along the pipe 10 and rods 12 as they rotate.

A welding electrode 16 engages the wire 14 as it is wrapped on the rods 12 and provides a welding current that fuses the wire 14 and the rods 12. The welding electrode 16 is disc-shaped and rolls along the wire 14. To complete the circuit for welding, the rods 12 are grounded ahead of the wrapped wire 14 using a ground electrode assembly 18.

The ground electrode assembly 18 includes a plurality of contact assemblies 20 and a mounting plate 28. Each contact assembly 20 includes a contact 22 and a housing 24. Proper alignment and contact is needed for good welding. Moreover, optical sensors, controls, and the like are used to ensure that proper spacing is maintained between wraps of the wire 14 and that the wire 14 is extruded properly.

Some wire-wrapped screens have long sections of wrapping along the base pipe 10. For other implementations, separate sections of screen are sometimes applied to a single base pipe at various intervals. One example of a wire-wrapped screen having multiple sections is the Mazeflo™ completion screen available from Exxon Mobil Corporation and disclosed in U.S. Pat. No. 7,464,752. (MAZEFLO is a trademark of Exxon Mobil Corporation.) These screens are sand screens having redundant sand control and baffled compartments. These screens isolates mechanical failure of the screen to the local compartments of the device's maze sections, while allowing continued hydrocarbon flow through the undamaged sections. The flow paths are offset so that the flow makes turns to redistribute the incoming flow momentum.

When manufacturing a wire-wrapped screen having separate screen sections, the wire wrapping process has to be stopped for each new screen section so ends of the screen section can be affixed to the base pipe. This is done using welds, or end rings can be inserted over the pipe before the next section of screen can be completed. Thus, a given section of wire wrapping has to be completed on the base pipe, and the base pipe must be removed from the wrapping apparatus so the end of the screen section can be secured to the base pipe before wrapping can proceed with the next screen section. This process is repeated until all the screen sections are completed on the base pipe. As will be appreciated, this form of manufacture for a wire-wrapped screen with multiple sections is time consuming and very costly.

The subject matter of the present disclosure is directed to overcoming, or at least reducing the effects of, one or more of the problems set forth above.

SUMMARY

Operators manufacture a wellscreen by forming a wire-wrapped screen on a base pipe. Rather than stopping and restarting the winding operation for each section, the desired length of screen is completed along the base pipe, and then the wire screen is segmented into a plurality of screen sections as required for the various zones and details of the implementation. Operators arrange the screen sections relative to one another on the base pipe. The screen sections can have different lengths, and the base pipe can have sections with and without perforations. On the free ends of these separate screen sections, operators install mating split ring components that fit around the free ends and the base pipe.

If the free end of the screen section is separated by an expanse of base pipe without perforations from the next section, then the end ring can weld to the base pipe to hold the screen section in place and to prevent fluid and particulates from entering the channels of the screen section between the base pipe and end ring.

Alternatively, screen sections may be situated next to one another, and abutting ends of the end rings can be welded together. These abutting end rings can define internal channels that allow flow from the adjoining screen sections to pass through the abutting end rings.

The end ring has at least two mating split ring components. Edges of one split ring component mate to complementary edges of another of the components to form the end ring around the screen section and base pipe. Preferably, the ends have mating male and female dovetails or grooves. For permanency, longitudinal welds are made in outside seams along the mating edges to affix the split ring components together.

The foregoing summary is not intended to summarize each potential embodiment or every aspect of the present disclosure.

DETAILED DESCRIPTION

FIGS. 2A-2D show a wire-wrapped wellscreen 50 having multiple sections during stages of assembly. The wellscreen 50 has a base pipe 60 that extends along the length of the wellscreen 50. This pipe 50 has a number of perforations 62 formed therein for passage of production fluid. As shown in the final assembly of FIG. 2D, screen sections 70A, 70B, etc. are disposed at desired intervals along the base pipe 60. Each screen section 70A, 70B, etc. is fitted with end rings 100 that affix the ends of the screen sections 70A, 70B, etc. to the base pipe 60 to secure the assembly. Each of the end rings 100 include at least two split ring components that mate together around the base pipe 60 and affix together. Further details of these end rings 100 are discussed later.

Rather than assembling the multiple screen sections 70A, 70B, etc. of the wellscreen 50 in the prior art manner described previously, the disclosed wellscreen 50 with multiple sections is manufactured in a different manner outlined in FIGS. 2A-2D.

Figure 2A:
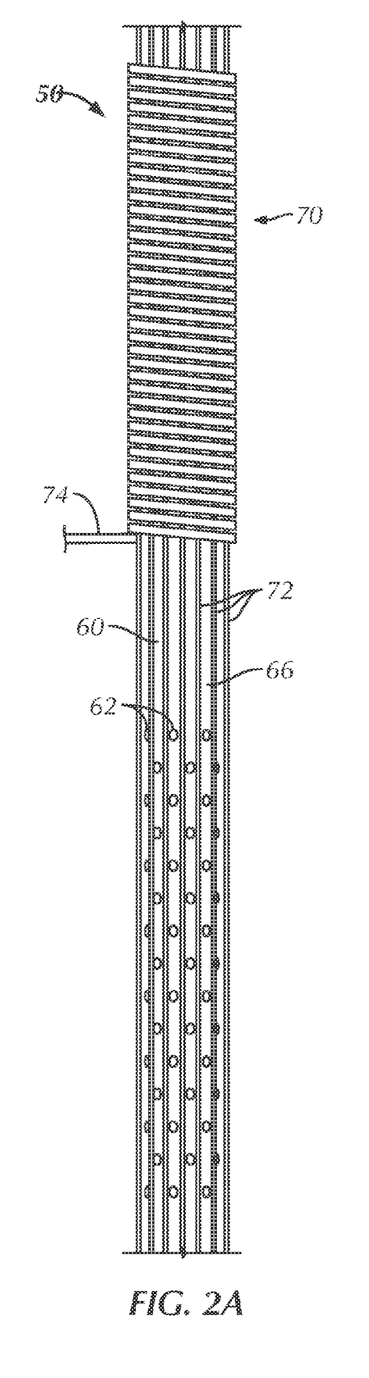
FIGS. 2A-2D show a wire-wrapped screen with multiple sections during stages of assembly.

Assembly begins with the perforated base pipe 60 as shown in FIG. 2A, which can be manufactured and machined according to conventional practices. Preferably, the base pipe 60 has multiple sections where perforations 62 are formed, which can be separated by predetermined, imperforate expanses of base pipe 60. Different sections of the base pipe 60 can have different number, sizes, shapes, configurations, and other aspects of the perforations 62 compared to other sections. The overall selection and layout of the perforations 62 depends on the particular implementation.

Figure 2B:
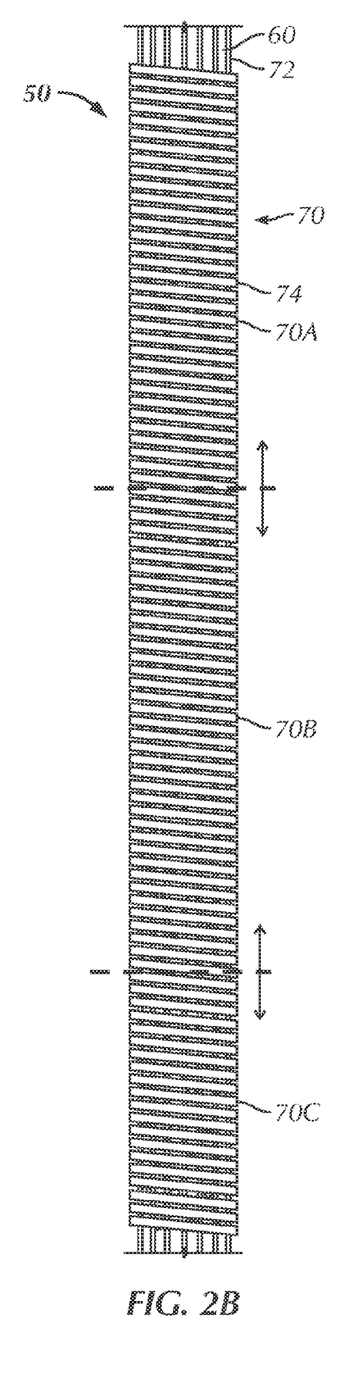

The rods 72 of the screen 70 are positioned around the base pipe 60 at desired spacings to form the desired longitudinal channels. Then, using a winding apparatus such as discussed previously with reference to FIGS. 1A-1B, a suitable length of the base pipe 60 is wrapped with wire 74 to form the screen 70 in one pass as shown in FIG. 2B. Typically, the size, shape, and spacing of the wire 74 remains relatively constant as the wire 74 is wrapped. Depending on the implementation and the different type of screen sections desired, any of these and other variables can be altered during the winding process so that the wire wrapping can change along its length.

Figure 2C:
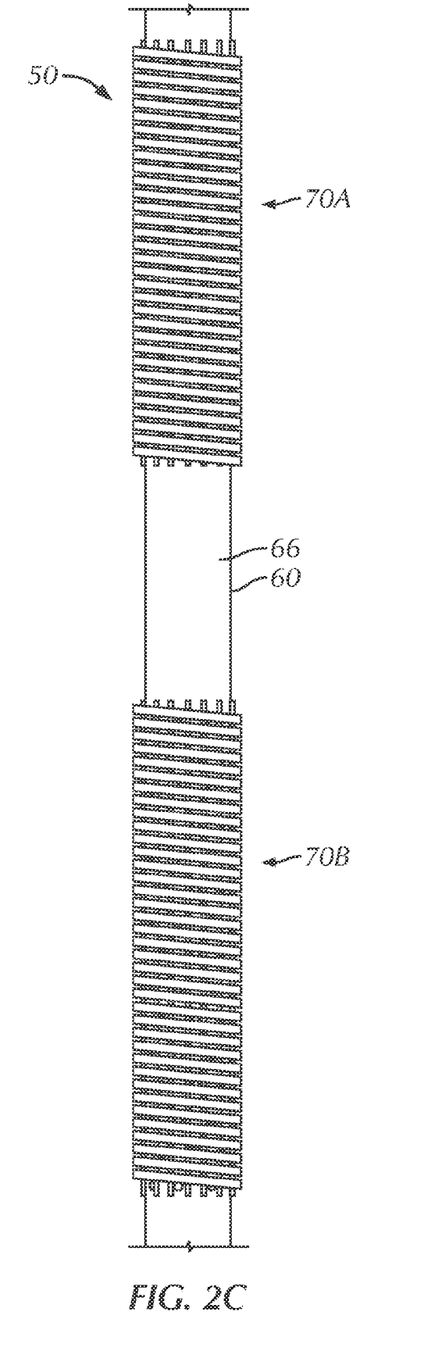

As shown in FIG. 2B, rather than stopping and restarting the winding for various sections, the wire wrapping continues along the extent of the base pipe 60 to produce enough wire-wrapped screen length as needed. Then, as shown in FIGS. 2B-2C, desired screen lengths for the various sections 70A, 70B, 70C, etc. of the screen 70 are cut from the full length to form the final screen sections 70A, 70B, 70C, etc. The sections 70A, 70B, 70C, etc. are the spaced out appropriately along the base pipe 60, which may have extents 66 lacking perforations 62 in between screen sections 70A, 70B, 70C, etc., as noted previously.

Figure 2D:
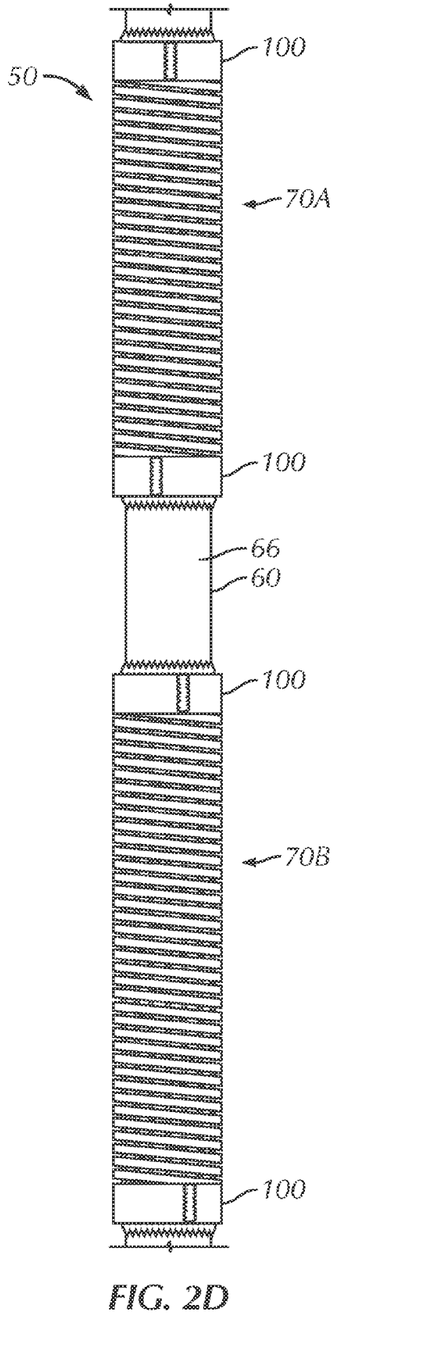

Finally, as shown in FIG. 2D, the split end rings 100 are then fitted to ends of these separated screen sections 70A, 70B, 70C, etc. to complete the assembly. As expected, this form of manufacture greatly simplifies the winding process and can improve the construction of the wellscreen 50.

Figure 3A:
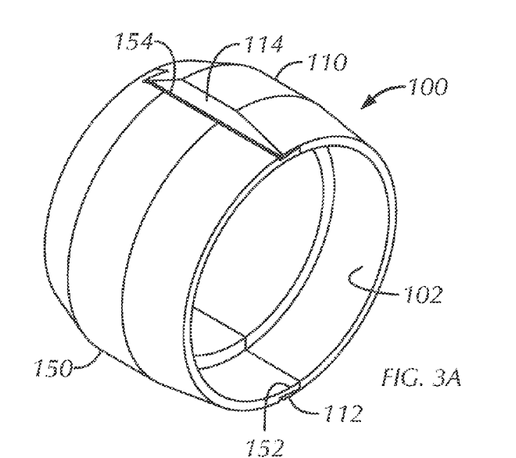
FIGS. 3A-3C show an end ring of the present disclosure in perspective, cross-sectional, and end views.
Figure 3B:
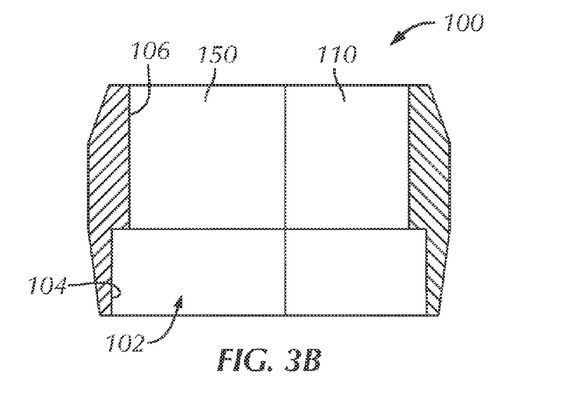
Figure 3C:
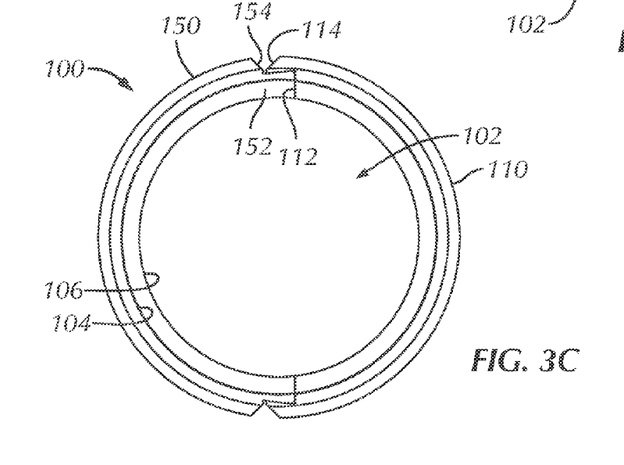

Turning to the end rings 100 in more detail, FIGS. 3A-3C show an end ring 100 of the present disclosure in perspective, cross-sectional, and end views. The end ring 100 has at least two split ring components 110, 150 separated along their axial direction. (Although two components 110, 150 are shown, more than two could be used.) One split ring component 150 has male edges 152 that mate with female edges 112 of the other split ring component 110. Preferably, the edges 112 and 152 define dovetail or groove surfaces to hold the edges 112 and 152 together before welding. Welds made in outside seams 114 and 152 along these mating edges 112 and 152 affix the two split ring components 110 and 150 together. Being split allows the end ring 100 to be assembled together over the base pipe (60) and the end of the screen section during assembly as discussed previously.

Figure 3D:
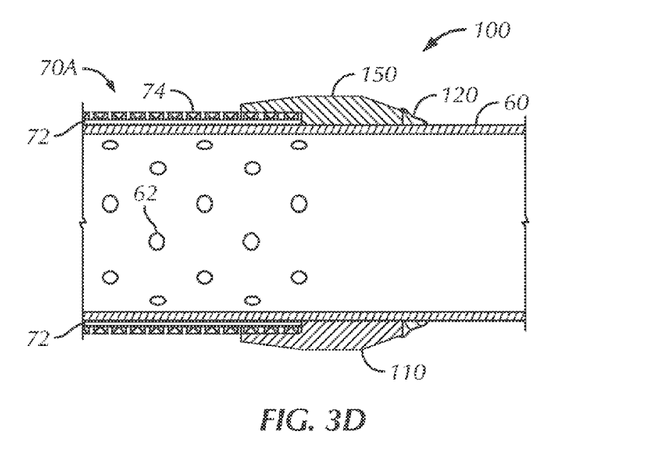
FIG. 3D shows an end ring of FIGS. 3A-3C disposed on a base pipe at an end of a screen section.

Internally, the end ring 100 defines an inner passage 102 that fits over the base pipe (60) and any components at the end of the screen section (70A). (FIG. 3D shows the end ring 100 of FIGS. 3A-3C disposed on the base pipe 60 at an end of a screen section 70A.) This inner passage 102 can have a wider portion 104 to accommodate the components (rod ends, wire, etc.) of the screen section (70A) and can have a narrower portion 106 for fitting more snuggly against the base pipe's outer surface. The back edge of the end ring 100 at this narrower portion 106 can be welded at (120) to the base pipe (60).

Figure 4:
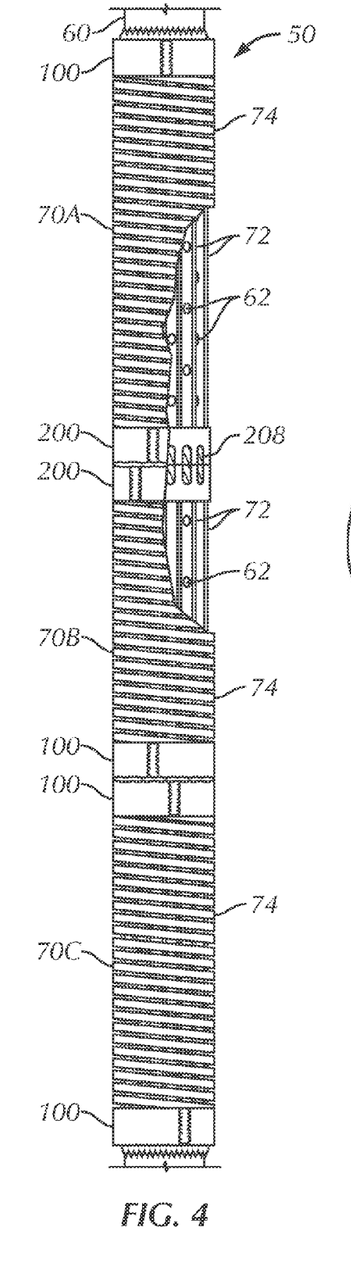
FIG. 4 shows another wire-wrapped screen with multiple sections.
Figure 6:
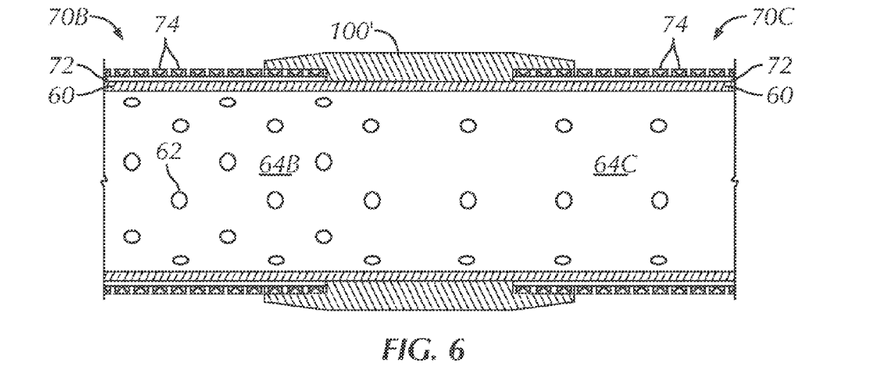
FIG. 6 shows an alternative end ring disposed on a base pipe at adjoining screen sections.

FIG. 4 shows another wellscreen 50 having multiple screen sections 70A, 70B, 70C, etc. Assembly of this wellscreen 50 can be similar to that discussed previously. Rather than separate all of the screen sections 70A, 70B, 70C, etc. from one another by an expanse of base pipe 60, at least some or all of the screen sections 70A, 70B, 70C, etc. adjoin one another end-to-end. End rings 100, such as disclosed previously, can abut one another end-to-end between adjoining screen sections (e.g., 70B and 70C). These end rings 100 can be welded together and/or to the base pipe 60. Although two of these end rings 100 can be separate from one another as shown, an integrally formed end ring can have two ends to achieve the same results between adjoining sections of wire screen. For example, an alternative end ring 100' having two ends as shown in FIG. 6 can be used between adjoining screen sections (e.g., 70B and 70C). As further shown in the example of FIG. 6, the perforations 62 in the base pipe 60 can be arranged in two sections 64B and 64C relative to the adjoining screen sections 70B and 70C.

Either way, the end rings 100 (or end ring 100') separate the two screen sections 70B and 70C. In this way, one screen section 70B disposed over a length of the base pipe 60 can have a same or different flow characteristic (produced by more or less perforations, different sized perforations, narrower or wider wire slot, different wire extrusions, or other differences) than the flow characteristics for the other screen section 70C on the base pipe 60. This can produce different properties of the wellscreen's operation along its length that can be suited for a particular implementation.

As another alternative to the end rings 100 (or in addition thereto), adjoining wire sections (e.g., 70A and 70B) can have another form of end ring 200. As before, these end rings 200 can abut one another between the screen sections 70A and 70B. Rather than isolate fluid communication between the screen sections 70A and 70B, these end rings 200 have internal channels 208 allowing for flow of fluid between them and the base pipe 60. In this way, one screen section 70A disposed over a length of the base pipe 60 can have the same or different flow characteristic than the length of base pipe 60 for the other screen section 70B. Yet, the two sections 70A and 70B can have cross-flow between them, which can be beneficial in some implementations.

Figure 5A:
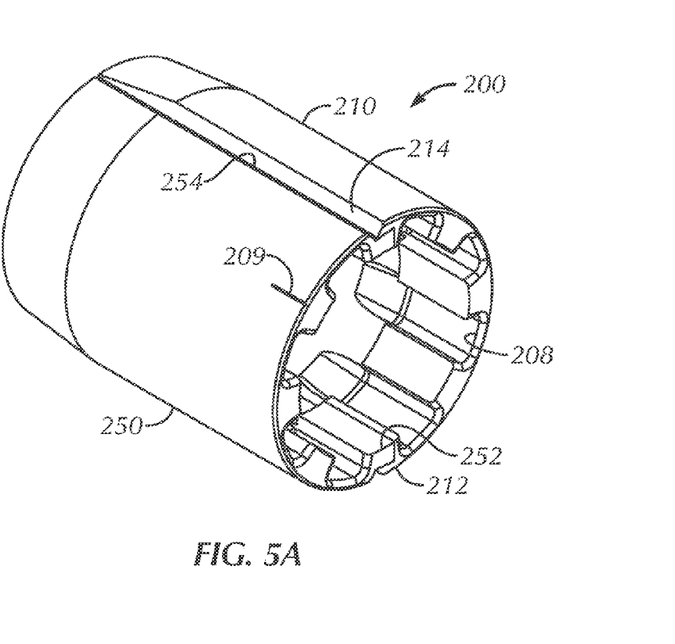
FIGS. 5A-5C show another end ring of the present disclosure in perspective, end, and cross-sectional views.
Figure 5B:
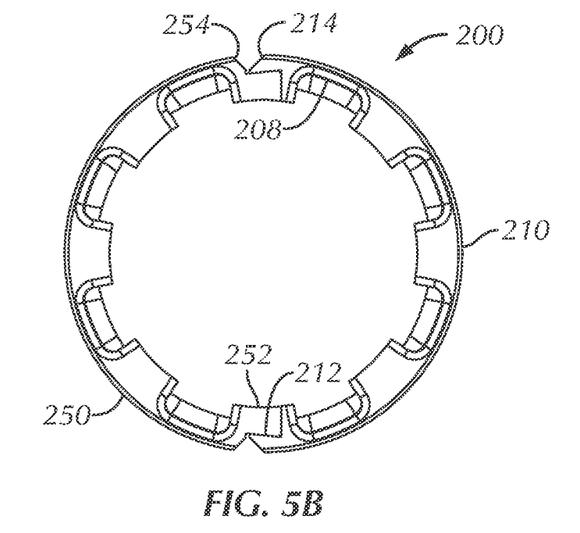
Figure 5C:
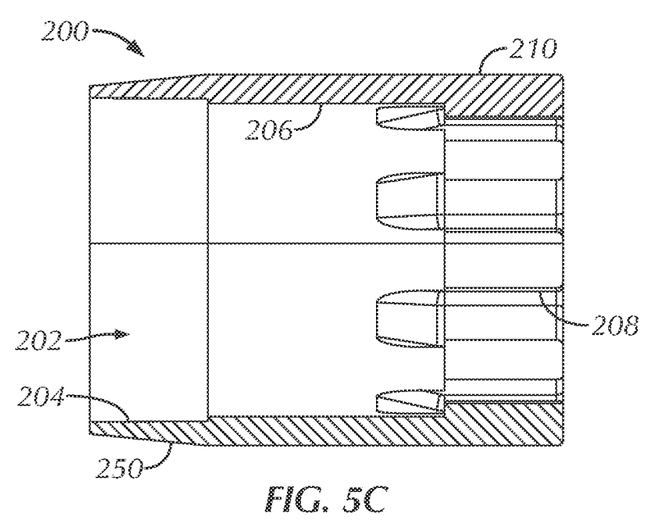

Turning to the end ring 200 in detail, FIGS. 5A-5C show an end ring 200 of the present disclosure in perspective, cross-sectional, and end views. The end ring 200 again has at least two split ring components 210, 250 separated along their axial direction similar to previous arrangements. One split ring component 250 has male edges 252 that mate with female edges 212 of the other split ring component 210. Preferably, the edges 212 and 252 define dovetailed or grooved surfaces to hold the edges 212 and 252 together before welding. Welds made in outer seams 214 and 252 along these mating edges 212 and 252 affix the two split ring components 210 and 250 together. As before, being split allows the end ring 200 to be assembled over the base pipe (60) and screen section (70) during assembly.

Figure 5D:
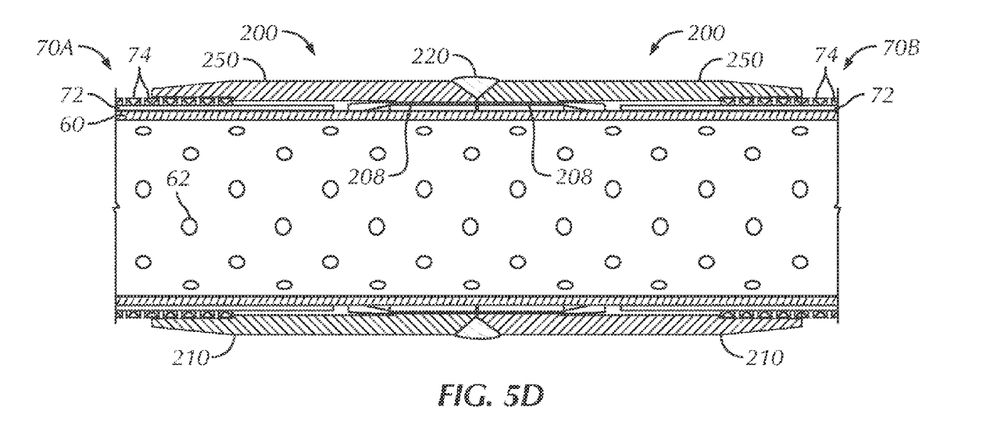
FIG. 5D shows end rings of FIGS. 5A-5C disposed on a base pipe at adjoining screen sections.

Internally, the end ring 200 defines an inner passage 202 that fits over the base pipe (60) and any components at the end of the screen section (70A). (FIG. 5D shows end rings 100 of FIGS. 5A-5C disposed on the base pipe 60 between adjoining screen sections 70A and 70B.) This inner passage 202 can have a wider portion 204 to accommodate the components (rod ends, wire, etc.) of the screen section (e.g., 70A) and can have a narrower portion 206 for fitting more snuggly against the base pipe's outer surface. The back edge of the end ring 200 at this narrower portion 106 also defines several channels 208. Fluid flow passing through the wire (74) on the accompanying screen section (70A) can flow along the base pipe (60) between the longitudinal rods (72). When reaching the end ring 200, the flow can pass through the ring's channels 208 and pass out the end of the ring 200. When this end ring 200 is abutting and joined to another like end ring 200 at weld (220), the flow can pass into the channels 208 of this other end ring 200 to communicate with the longitudinal space between the rods (72) of the adjoining screen section (e.g., 70B). To align the channels 208 on abutting ends of the rings 200, the outer surface may be machined with a guide 209 or the like as best shown in FIG. 5A.

Figure 7:
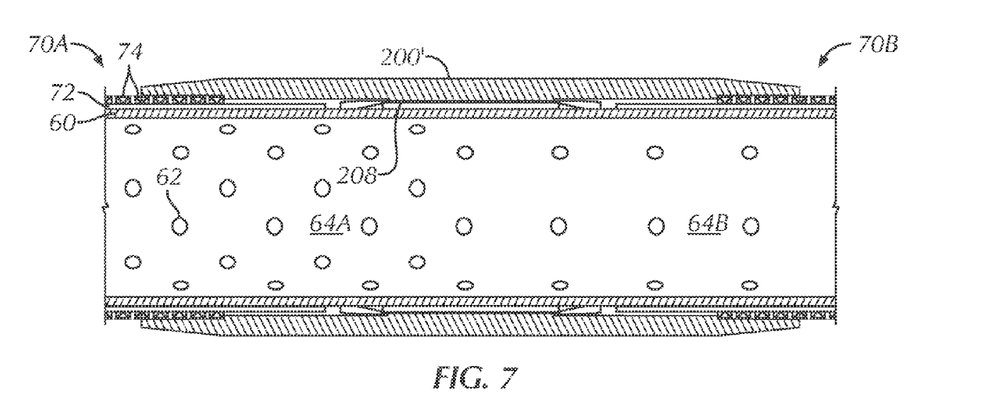
FIG. 7 shows yet another alternative end ring disposed on a base pipe at adjoining screen sections.

Although shown formed uniformly around the inside of the end ring 200, other less symmetrical arrangements of the channels 208 may be used, and the communicating channels 208 between abutting end rings 200 can cross-communicate in any desirable pattern according to the implementation. Although two of these end rings 200 can abut one another as shown, an integrally formed end ring can have two ends to achieve the same results. For example, FIG. 7 shows an integral end ring 200' with channels 208 disposed on the base pipe 60 between adjoining screen sections 70A and 70B. As further shown in the example of FIG. 7, the perforations 62 in the base pipe 60 can be arranged in two sections 64A and 64B relative to the adjoining screen sections 70A and 70B.

Figure 8:
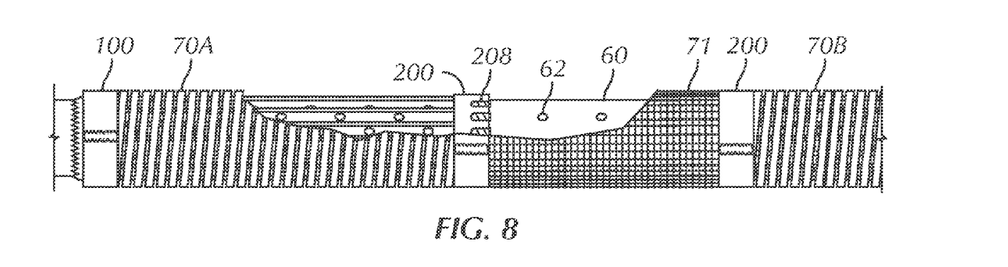
FIG. 8 shows another arrangement of end rings and screen sections on a base pipe for a wellscreen.

Moreover, although the end rings 200 of FIGS. 5A-5D abut one another between sections of wire-wrapped screen, the end rings 200 could be separated by an expanse of base pipe 60 having or not having perforations. As shown in FIG. 8, this separated expanse of base pipe 60 can have another type of screen material disposed thereabout, such as a mesh screen 71. Yet, the end rings 200 may allow the screen sections 70A and 70B to which they are disposed communicate fluid with this intermediate screen section 71.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A wellscreen manufacturing method, comprising:
providing a base pipe with one or more perforations defined therein;
forming a wire-wrapped screen on the base pipe;
segmenting the wire-wrapped screen into a plurality of screen sections;
arranging the screen sections on the base pipe relative to the one or more perforations; and
positioning split end rings on free ends of the screen sections by:
  positioning a first side of a first of the split end rings on a first of the free ends of a first of the screen sections,
  positioning a first side of a second of the split end rings on a second of the free ends of a second of the screen sections, and
  matting male and female edges running longitudinally along at least two components of each of the split end rings.

2. The method of claim 1, wherein forming the wire-wrapped screen comprises positioning rods longitudinally along the base pipe and wrapping wire around the rods.

3. The method of claim 2, wherein segmenting the wire-wrapped screen into the plurality of screen sections comprises separating two of the screen sections from one another by cutting the wire and rods laterally relative to the base pipe.

4. The method of claim 1, wherein one of the screen sections disposed on the base pipe comprises a different flow characteristic compared to another of the screen sections disposed on the base pipe.

5. The method of claim 4, wherein the one screen section disposed on the base pipe comprises one or more of: a different length along the base pipe, more or less perforations in the base pipe, different sized perforations in the base pipe, narrower or wider wire slots, and different wire extrusions than the other screen section.

6. The method of claim 1, wherein arranging the screen sections on the base pipe relative to the one or more perforations comprises separating at least the first and second screen sections by an expanse of the base pipe.

7. The method of claim 6, wherein separating at least the first and second screen sections by the expanse of the base pipe comprises positioning the first screen section adjacent a first of the one or more perforations, and positioning the second screen section adjacent a second of the one or more perforations.

8. The method of claim 7, wherein the first of the one or more perforations is different from the second of the one or more perforations.

9. The method of claim 6, further comprising positioning a third screen section on the expanse of the base pipe separating the first and second screen sections.

10. The method of claim 9, wherein the third screen section comprises a different type of screen than the screen sections of the wire-wrapped screen.

11. The method of claim 1, wherein positioning the split end rings on the free ends of the screen sections comprises positioning one of the split end rings on one of the free ends of one of the screen sections and on an adjacent portion of the base pipe.

12. The method of claim 11, wherein positioning the one split end ring on the adjacent portion of the base pipe comprises welding the one split end ring to the base pipe.

13. The method of claim 1, wherein mating the male and female edges running longitudinally along the at least two components of each of the split end rings comprises welding the longitudinally mated male and female edges together on each of the split rings.

14. The method of claim 13, wherein welding the longitudinally mated male and female edges together on each of the split rings comprises welding in seams defined externally at the matted male and female edges.

15. The method of claim 1, wherein a first of the at least two components comprises the male edges; and wherein a second of the at least two components comprises the female edges mating with the male edges.

16. The method of claim 1, wherein positioning the split end rings on the free ends of the screen sections further comprises:
    abutting second sides of the first and second split end rings together.

17. The method of claim 16, further comprising welding the abutting second sides of the first and second split end rings together.

18. The method of claim 16, further comprising permitting fluid communication longitudinally between the first and second split end rings abutting one another.

19. The method of claim 18, wherein permitting the fluid communication longitudinally between the first and second split end rings abutting one another comprises communicating channels defined longitudinally in the first and second split end rings.

20. The method of claim 1, wherein providing the base pipe with the one or more perforations comprises providing the base pipe with at least two perforated sections, a first of the perforated sections designated for a first of the screen sections, a second of the perforated sections designated for a second of the screen sections.

21. The method of claim 1, further comprising permitting fluid communication longitudinally through at least one channel in one of the split end rings.

22. The method of claim 1, wherein positioning the split end rings on the free ends of the screen sections comprises:
    positioning the first side of the first of the split end rings on the first of the free ends of the first of the screen sections; and
    positioning a second side of the first split end ring on a third of the free ends of one of the adjacent screen sections.

23. The method of claim 22, further comprising permitting fluid communication between the first and adjacent screen sections through at least one channel defined longitudinally in the first split end ring.

24. The method of claim 22, further comprising preventing fluid communication between the first and adjacent screen sections longitudinally through the first split end ring.

25. A wellscreen manufactured by a method, comprising:
    providing a base pipe with one or more perforations defined therein;
    forming a wire-wrapped screen on the base pipe;
    segmenting the wire-wrapped screen into a plurality of screen sections;
    arranging the screen sections on the base pipe relative to the one or more perforations; and
    positioning split end rings on free ends of the screen sections by:
        positioning a first side of a first of the split end rings on a first of the free ends of a first of the screen sections,
        positioning a first side of a second of the split end rings on a second of the free ends of a second of the screen sections, and
        matting male and female edges running longitudinally along at least two components of each of the split end rings.

* * * * *